Patented Mar. 7, 1939

2,149,284

UNITED STATES PATENT OFFICE 2,149,284

COMPOSITION AND PROCESS FOR PRESERVING WOOD

Aaron Gordon, Berkeley, Calif.

No Drawing. Application November 16, 1935,
Serial No. 50,182

7 Claims. (Cl. 21—26)

This invention relates to treating wood to preserve it, and more particularly to the protection thereof against wood-attacking organisms so that it will have a longer life when used for piling, telephone poles, fence posts, railroad ties, and the like. My treatment may be applied to standing, growing trees, to trees that have been felled and that are still living, that is, trees in which the sap still flows, and to trees that have been felled and in which the sap has dried or no longer flows, which trees are therefore dead.

My invention comprises primarily the use of an ammoniacal solution containing copper and arsenic and preferably, also, the acetic acid radical, so that after injection thereof into the wood or impregnation of the wood thereby, the ammonia may be dissipated by evaporation whereby toxic copper and/or copper-arsenic and/or copper-arsenic-acetate compounds of different degrees of solubilities are precipitated within the tissues of the wood. The solution I use is such that the flow thereof through the wood is automatically and spontaneously accelerated by its very nature, since the basic copper-ammonium complex, being a solvent for certain celluloses, dissolves or softens the membranes which separate adjacent wood cells. The solution of the toxic agent thus functions as its own penetrating agent.

As one way of preparing 1000 liters of the treating solution and the preferable way, I dissolve 63.2 kilograms of commercial copper sulphate, $CuSO_4 \cdot 5H_2O$, in 200 l. of water, and add to the resulting solution, with stirring, another solution prepared by dissolving 20.224 kgs. of sodium hydroxide in 50 l. of water. The resulting precipitate, which is hydrated copper hydroxide having the formula $Cu(OH)_2 \cdot xH_2O$, wherein "$x$" may have an unknown or a variable value, is then separated from the mother liquor, and to this precipitate I add 1000 l. of water, and 17.75 kgs. of ammonia gas, $NH_3$, is run therein. The copper hydroxide and the ammonia react to form copper-ammonium hydroxide which is a much stronger base than ammonium hydroxide and dissociates into the copper-ammonium complex ion $Cu(NH_3)_4^{++}$ and the hydroxyl ion $OH$. I add thereto 21.2 kgs. of arsenious oxide, $As_2O_3$, known in the trade as "white arsenic", and 600 grams of glacial acetic acid, with suitable stirring. The arsenious oxide forms various negative ions in the solution.

The resulting solution contains hydrated copper-ammonium complex $Cu(NH_3)_4^{++}H_2O$ as the positive ion and as the negative ion arsenic as arsenious ion $AsO_2$. Other negative ions are acetate ions $C_2H_3O_2$ and free hydroxide ions $(OH-)$. It should be understood that in a system of this character some of the arsenic is oxidized to arsenate ions while some of the copper is reduced to cuprous ions. The solution may be used as such or diluted with water to any desired strength, the concentration of the solution used depending on the amount of preservative desired per cubic foot of lumber. As an example of the strength used, I may state that when the wood is to be used for pilings under water, a good strength of solution may be made by diluating the solution prepared as described above with an equal volume of water; and, as another example, if the wood is to be used on land instead of in the water, one volume of the solution prepared as described above may be diluted with three volumes of water. Other strengths will, of course, be suitable for various purposes.

The wood may be made to take up the toxic solution in any desired manner, and since various methods of causing this are known, they need not be described herein.

Living wood is much more permeable to the solution than wood which is no longer living, so that while a hydrostatic pressure equal to a column of, say, ten to fifteen feet high of the solution is sufficient to cause suitable impregnation of living wood, a pressure of from seventy-five to one hundred pounds per square inch is frequently used in the treatment of timber which has been cut and dried.

The duration of the impregnation treatment will, for any one type of wood, be shortened, of course, by increasing the applied pressure. The figures given are suitable for a duration of treatment of the order of an hour, but such duration will, of course, be varied for different kinds of wood, that is, for wood from different species of trees. As an example, I may state that at a pressure of seventy-five pounds per square inch, one hour is required for the treatment of cut and dried white fir, while two hours are required for cut and dried Douglas fir at this same pressure. Ordinarily, air temperatures are generally satisfactory, no artificial heat being necessary for the impregnation treatment under ordinary working conditions.

I prefer to proportion the ingredients used in making up the treatment solution so that about 90% of the positive ions of the copper-ammonia complex therein will be the equivalent of the negative ions present and comprising arsenic and/or arsenic and the acetic acid radical; while about 10% of the positive copper-ammonia ions will be the equivalent of the negative hydroxyl ions present, the equivalency being stoichemical and not a gram-for-gram relation. This may be accomplished by the specific example heretofore given.

After injection and on exposure to the air, ammonia, $NH_3$, is dissipated by evaporation, and as this evaporates, various compounds of copper and arsenic and/or of copper, arsenic and the acetic acid radical precipitate within the wood tissue, such, for example, as one or more types of copper arsenite and copper arsenate, Paris green, copper oxide or basic carbonate, and perhaps other compounds as well. With the proportions previously indicated for making up the solution, about 10% of the precipitate in the wood tissue seems to be Paris green, about 10% mixed oxide and basic carbonate, and about 80% of the precipitate appears to be salts of various solubilities containing copper and arsenic.

The alkalinity of the product is increased by making the solution of the copper-ammonium complex from the precipitated copper hydroxide instead of from a copper salt, such for example as copper sulphate, the pH of which is somewhat on the acid side. The copper base of copper precipitated in the wood, by mass action has the effect of preventing hydrolysis of any of the copper and/or arsenic compounds precipitated in the wood, even though the wood be submerged in fresh water or in sea water. This is important since without this feature the insoluble salts would be gradually hydrolyzed and thus become soluble, so that toxic material would in time be washed away. Furthermore, the complex compound $Cu(NH_3)_4(OH)_2$ has, in aqueous solution a solvent action on cellulose which aids penetration of the wood by the solution with which it is treated.

On evaporation of the ammonia, various salts of copper and arsenic radicals, also of copper, acetate and arsenic radicals precipitate. Moreover, due to the excess of hydroxyl ions in the solution, some of the copper which is in the cupric form is reduced to the cuprous form, while some of the arsenic which is in the arsenious form is oxidized to the arsenic form. There is thus precipitated in the wood not only the above mentioned substances but also cuprous oxide, $Cu_2O$, and cupric arsenate. In fact, the wood often takes on the red color of the cuprous oxide.

The non-leachable basic copper material, such as copper oxide or copper hydroxide, is present in an amount sufficient to react with any liberated hydrolyzed compounds precipitated in the wood from the copper-arsenic compounds, thereby preventing leaching of the copper-arsenic compounds from the wood.

By the term "radical" as used in the claims, I mean to include single atoms as well as groups of atoms.

I have described the preferred way of preparing my treatment material and the resulting product as illustrative of but not as limiting my invention, and it is to be understood that changes may be made in the treating material and/or the process of preparing it without departing from the spirit thereof.

Having described my invention, what I claim and desire to secure by Letters Patent is:

1. The process of making a solution for injection into wood, comprising making a solution consisting of 1000 liters of water and positive and negative ions therein, said positive ions corresponding to about 16 kilograms of copper and about 17.75 kilograms of ammonia, said negative ions being hydroxyl, and adding thereto about 21.2 kilograms of arsenious oxide and about 600 grams of glacial acetic acid.

2. An aqueous ammonical solution for impregnating wood to preserve the same comprising the reaction product of copper ammonium hydroxide and an excess of ammonia, and arsenious oxide adapted to dissolve in said excess of ammonia said arsenious oxide being present in an amount sufficient to react with only a portion of the copper ammonium ion present and leave in solution a copper ammonium complex hydroxide in a quantity sufficient to aid in the penetration of the solution into the wood and to prevent the hydrolysis of any precipitated arsenic compounds formed after injection of the solution into the wood.

3. An aqueous ammonical solution for impregnating wood to preserve the same comprising the reaction product of copper ammonium hydroxide and an excess of ammonia, and arsenious oxide in the presence of acetic acid, said arsenious oxide being adapted to dissolve in said excess of ammonia and being present in an amount sufficient to react with only a portion of the copper ammonium ion present and leave in solution a copper ammonium complex hydroxide in a quantity sufficient to aid in the penetration of the solution into the wood and to prevent the hydrolysis of any precipitated arsenic compounds formed after injection of the solution into the wood.

4. The method of preserving wood comprising impregnating it with the reaction product of copper ammonium hydroxide and an excess of ammonia and arsenious oxide adapted to dissolve in said excess of ammonia, said arsenious oxide being present in an amount sufficient to react with only a portion of the copper ammonium ion present and leave in solution a copper ammonium complex hydroxide in a quantity sufficient to aid in the penetration of the solution into the wood and to prevent the hydrolysis of any precipitated arsenic compounds formed after injection of the solution into the wood.

5. An aqueous ammonical solution for impregnating wood to preserve the same comprising the reaction product of copper ammonium hydroxide and an excess of ammonia, and an arsenious compound adapted to dissolve in said excess of ammonia and to react with the copper ammonium hydroxide to produce copper arsenic compounds of varying degrees of solubility in the wood, said arsenic compound being present in an amount sufficient to react with only a portion of the copper ammonium ion present and leave in solution a copper ammonium complex hydroxide in a quantity sufficient to aid in the penetration of the solution into the wood and to prevent the hydrolysis of any precipitated arsenic compounds formed after injection of the solution into the wood.

6. An aqueous ammonical solution for impregnating wood to preserve the same comprising the reaction product of copper ammonium hydroxide, an excess of ammonia and acetic acid, and an arsenic compound capable of reacting with the copper ammonium hydroxide to produce copper arsenic compounds of varying degrees of solubility in the wood in the presence of acetic acid, said arsenic compound being present in an amount sufficient to react with only a portion of the copper ammonium ion present and leave in solution a copper ammonium complex hydroxide in a quantity sufficient to aid in the penetration of the solution into the wood and to prevent the hydrolysis of any precipitated arsenic compounds formed after injection of the solution into the wood.

7. The method of preserving wood comprising impregnating it with the reaction product of copper ammonium hydroxide and an excess of ammonia and an arsenic compound adapted to dissolve in said excess of ammonia and capable of reacting to produce copper arsenic compounds of varying degrees of solubility in the wood, said arsenic compound being present in an amount sufficient to react with only a portion of the copper ammonium ion present and leave in solution a copper ammonium complex hydroxide in a quantity sufficient to aid in the penetration of the solution into the wood and to prevent the hydrolysis of any precipitated arsenic compound formed after injection of the solution into the wood.

AARON GORDON.